3,082,823
Patented Mar. 26, 1963

3,082,823
COMPOSITION AND METHOD FOR SEALING POROUS FORMATIONS
Wayne F. Hower, Duncan, Okla., assignor to Halliburton Company, a corporation of Delaware
No Drawing. Filed Mar. 31, 1960, Ser. No. 18,811
4 Claims. (Cl. 166—29)

This invention relates to compositions and methods useful in treating oil or gas wells or the like. More particularly, it relates to a composition and method useful in sealing zones or formations of lost circulation.

In the drilling of wells, a fluid such as drilling mud is commonly employed to lubricate the drilling string and bit and to carry cuttings from the bit to the surface. Sometimes while drilling wells, zones or formations are encountered which are extremely porous or for other reasons tend to permit the flow of fluids from the borehole thereinto. Such zones or formations are commonly referred to as thief or lost circulation formations. At times the thief formation may be taking the fluid as fast as it is pumped into the well and even in less severe situations circulation of the fluid may be greatly hampered, resulting in a shutdown of drilling operations. Drilling is not generally resumed until the thief formation is closed off and circulation of the drilling fluid re-established.

The fluids used in drilling may be of either petroleum or water base with certain other materials added to meet the specific requirements of the well. Water base drilling fluids may contain a high degree of salts, such as sodium, calcium, and magnesium chlorides, in some instances. Attempts to shut off their formations in the past have met with a certain degree of success, but difficulty has been encountered in some instances when the water base of the drilling fluid contained salt. An example of a method and material used to prevent the loss of drilling fluids into the formation is disclosed in U.S. Patent No. 2,425,768, issued August 19, 1947, to Cary R. Wagner. This patent discloses the concept of using a water soluble alkali metal carboxymethylcellulose added directly to a water base drilling fluid containing bentonite to form a more viscous but pumpable mixture which is empervious to the salts that may be in the water base.

It is one object of this invention to provide an improved composition and method useful in treating oil or gas wells or the like.

Another object of this invention is to provide an improved composition that will form in a lost circulation zone a stiff gel-like mass upon contact with water base fluids regardless of whether or not the fluids contain salt.

Further objects of the invention are to provide an improved composition adapted to form a stiff gel-like mass upon contact with a water-base fluid and to provide an improved method wherein such composition is utilized in wells to seal off thief or lost circulation formations.

The foregoing and additional objects and advantages are attained by the invention, which involves the concept of utilizing a quantity of natural synthetic gum and a quantity of bentonite, which ingredients are introduced together into a lost circulation zone of a well and then allowed or caused to contact water.

As used herein, the term "gum" includes both natural and synthetic gums. Examples of natural gums are guar gum, gum arabic, gum karaya, and gum tragacanth. Examples of synthetic gums are carboxymethyl hydroxyethyl cellulose, methyl cellulose, and carboxymethyl cellulose.

In one way of proceeding, a fluid composition in the form of a mixture or slurry is first prepared by adding quantities of the gum and bentonite to a substantially non-aqueous carrying fluid which may be a hydrocarbon liquid, such as diesel fuel, kerosene, some crude oil or the like. This mixture or slurry may also contain cotton seed hulls, rice hulls, cotton linters, shredded cellulose, or any of the other commonly used materials capable of adding bulk. Also, any of various other ingredients or chemical agents may be included.

After preparation thereof, the fluid composition is introduced into the well to be treated, such as by pumping the composition downwardly through a well tubing extending to a desired depth in the well. Then the fluid composition is caused or allowed to contact and enter the lost circulation zone to be treated. Also, the composition is caused or allowed to contact water whereby a stiff gel-like mass is formed.

Laboratory tests have been conducted wherein numerous natural and synthetic gums were evaluated. In one series of tests, various percentages of the material used in preparing a fluid composition in accordance with the invention were combined in order to ascertain the most desirable material.

A control test was run using bentonite combined with diesel oil as the carrying agent. In this test the mixture was poured into two separate containers, one containing tap water and the other containing a standard brine solution. (The standard brine solution consisted of water, sodium chloride, calcium chloride, and magnesium chloride.) The mixture poured into the tap water formed into a stiff gel, but that poured into the brine formed very little gel and practically no viscosity increase was noted.

Similar tests were performed using gums alone suspended in the diesel oil carrying agent. Tests were made using guar gum, gum arabic, gum karaya, gum tragacanth, carboxymethyl hydroxyethyl cellulose, carboxymethyl cellulose, methyl cellulose, and a modified starch sold under the trade name "Impermex."

In the tests performed, all of these gums gelled approximately the same in both the tap water and the brine. However, these tended to settle badly on standing without agitation.

Further tests were performed in a manner similar to those mentioned above using mixtures of gum and bentonite wherein the materials were combined in varying percentages by weight based on the weight of the mixture. Better gel stiffness was obtained in all cases when the mixtures were placed in the tap water as compared to those placed in the brine. The results of these tests showed that an optimum gel stiffness was attained when about 10 percent gum by weight of the mixture was used and that there was no increase in gel stiffness when higher percentages of the gum were used. It is also significant to note that gels formed with the gum-bentonite did not settle on standing as did the gels formed using gum alone. I prefer, based on practical considerations such as cost, availability, etc., to use a mixture of 10 percent of either guar gum or carboxymethyl cellulose and 90 percent bentonite, the percentages being by weight of the mixture.

In practicing the method of this invention, it should be noted that the following description relates to the use of the preferred composition by way of example only and that any of the compositions of the invention could be substituted therefor.

The composition comprising 10 percent by weight of guar gum is first mixed with 90 percent by weight of bentonite and then suspended in a carrying agent such as diesel oil. The composition is then pumped down the interior of a tubing or drill pipe suspended in a well bore. The composition may be followed by a cementing plug which serves to separate the composition from a displacing fluid such as drilling mud. Drilling mud would probably be used as a displacing fluid because of its availability and economy even though the carrying agent could be used. A sufficient quantity of the displacing fluid would be used to force the compositions out of the lower end of the tubing and back up the annulus between the tubing and the wall of the well until it is positioned adjacent the lost circulation zone.

Simultaneously, water-base drilling fluid is pumped down the annulus, meeting the composition at the lost circulation zone. Pressure is then applied on both the fluid in the annulus and that in the tubing so that the composition and the drilling fluid in the annulus are forced into the lost circulation zone. As these materials move into the formation, they are placed in rather intimate contact whereby the water in the drilling fluid contacts the composition resulting in a gellation which forms a relatively impermeable sealing mass in the formation. When this seal forms, drilling may be resumed and circulation in the well bore may be re-established since little or no drilling fluid will pass through the seal into the lost circulation zone.

It should be apparent that this procedure may be reversed as to which material is pumped down the tubing and the annulus since the most important phase is to bring the composition into contact with the water, salt-containing or otherwise, in the drilling fluid.

It is important to note that the aforementioned Wagner patent contemplates a viscous but pumpable mixture lasting throughout the normal life of the drilling fluid while this invention involves the concept of forming a nonpumpable relatively impermeable sealing mass in the lost circulation zone and does not in any manner relate to the drilling fluid itself.

The method and compositions as described above are by way of example only and it should be apparent that many variations thereto may be made without departing from the spirit of the invention or the scope of the annexed claims.

I claim:

1. A method of treating oil wells, gas wells and the like to restore lost circulation which comprises the steps of forming a slurry of bentonite and a gel-forming gum selected from the group consisting of natural gel-forming gums and synthetic gel-forming gums, in a nonaqueous liquid carrier in proportions such that upon contact with an aqueous fluid selected from the group consisting of fresh water, salt water, brines and mixtures thereof a stiff gel-like mass is formed, forcing the slurry into a lost circulation formation in said well and contacting the slurry therein with the aqueous fluid to form a stiff fluid impervious gel, thereby sealing off the formation and restoring circulation in the well.

2. A method of sealing porous formations, comprising the steps of: introducing into the formation a nonaqueous liquid carrier having suspended therein a composition adapted to form a stiff fluid impervious gel following contact thereof with an aqueous fluid selected from the group consisting of fresh water, salt water, brine and mixtures thereof, said composition consisting essentially of a mixture of bentonite and a gel-forming gum selected from the group consisting of natural gel-forming gums and synthetic gel-forming gums; and, contacting said composition with the aqueous fluid thereby forming the stiff fluid impervious gel.

3. A method of sealing porous formations, comprising the steps of: introducing into the formation a composition suspended in a nonaqueous liquid carrier, said composition consisting essentially of a mixture of about 90% bentonite by weight of mixture and about 10% by weight of mixture of a gel-forming gum selected from the group consisting of natural gel-forming gums and synthetic gel-forming gums, and contacting said composition with an aqueous fluid selected from the group consisting of fresh water, salt water, brine and mixtures thereof, whereby a stiff fluid impervious gel is formed in said formation.

4. A method of sealing porous formations, comprising the steps of: introducing into the formation a composition suspended in a nonaqueous liquid carrier, said composition consisting essentially of a mixture of bentonite and guar gum; and contacting said composition with an aqueous fluid selected from the group consisting of fresh water, salt water, brine and mixtures thereof, whereby a stiff fluid impervious gel is formed in said formation.

References Cited in the file of this patent

UNITED STATES PATENTS

| | | |
|---|---|---|
| 2,065,512 | Cannon | Dec. 29, 1936 |
| 2,233,872 | Proctor | Mar. 4, 1941 |
| 2,337,296 | Kennedy et al. | Dec. 21, 1943 |
| 2,598,170 | Huebotter | May 27, 1952 |
| 2,800,964 | Garrick | July 30, 1957 |
| 2,801,077 | Howard et al. | July 30, 1957 |
| 2,887,159 | Harley et al. | May 19, 1959 |

UNITED STATES PATENT OFFICE
CERTIFICATE OF CORRECTION

Patent No. 3,082,823            March 26, 1963

Wayne F. Hower

It is hereby certified that error appears in the above numbered patent requiring correction and that the said Letters Patent should read as corrected below.

Column 1, line 33, for "their" read -- thief --; line 43, for "empervious" read -- impervious --.

Signed and sealed this 8th day of October 1963.

(SEAL)
Attest:

ERNEST W. SWIDER
Attesting Officer

EDWIN L. REYNOLDS

Acting Commissioner of Patents